United States Patent
Maino et al.

(10) Patent No.: US 9,407,544 B1
(45) Date of Patent: Aug. 2, 2016

(54) NETWORK VIRTUALIZATION USING IP MAP AND ENCAPSULATION

(71) Applicant: CISCO TECHNOLOGY, INC., San Jose, CA (US)

(72) Inventors: Fabio Maino, Palo Alto, CA (US); Darrel Lewis, San Mateo, CA (US); John Mullooly, Colts Neck, NJ (US); Gregg Schudel, Coronado, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 14/259,483

(22) Filed: Apr. 23, 2014

Related U.S. Application Data

(60) Provisional application No. 61/817,582, filed on Apr. 30, 2013, provisional application No. 61/859,464, filed on Jul. 29, 2013.

(51) Int. Cl.
  *H04L 12/713* (2013.01)
  *H04L 12/723* (2013.01)
  *H04L 12/755* (2013.01)
  *H04L 12/715* (2013.01)

(52) U.S. Cl.
  CPC ............ *H04L 45/586* (2013.01); *H04L 45/021* (2013.01); *H04L 45/502* (2013.01); *H04L 45/50* (2013.01); *H04L 45/64* (2013.01)

(58) Field of Classification Search
  None
  See application file for complete search history.

(56) References Cited

U.S. PATENT DOCUMENTS

| | | | | |
|---|---|---|---|---|
| 8,166,205 | B2 | 4/2012 | Farinacci et al. | |
| 9,019,962 | B1* | 4/2015 | Ghosh | H04L 45/586 370/392 |
| 2006/0168279 | A1* | 7/2006 | Lee | H04L 12/4641 709/230 |
| 2006/0182037 | A1* | 8/2006 | Chen | H04L 12/4641 370/252 |
| 2007/0280241 | A1* | 12/2007 | Verma | H04L 12/4641 370/392 |
| 2009/0059914 | A1* | 3/2009 | Khalid | H04L 12/2854 370/389 |
| 2011/0110370 | A1* | 5/2011 | Moreno | H04L 45/04 370/392 |
| 2012/0016977 | A1* | 1/2012 | Robertson | H04L 63/20 709/224 |
| 2012/0176934 | A1 | 7/2012 | Farinacci et al. | |

OTHER PUBLICATIONS

IETF RFC 3931, "Layer Two Tunneling Protocol—Version 3 (L2TPv3)", J. Lau, Ed., Mar. 2005.
IETF RFC 2784, "Generic Routing Encapsulation (GRE)", D. Farinacci, Mar. 2000.

* cited by examiner

*Primary Examiner* — Gary Mui
(74) *Attorney, Agent, or Firm* — Cindy Kaplan

(57) ABSTRACT

In one embodiment, a method includes receiving a packet at a first provider edge device in communication with a mapping system comprising mappings of customer routes to provider edge devices, and mappings of customer virtual routing and forwarding (VRF) instances to a service provider VRF instance, mapping a customer route to one of the provider edge devices and mapping a customer VRF instance to the service provider VRF instance, encapsulating the packet at the first provider edge device based on the mappings, and transmitting the packet to the provider edge device. An apparatus and logic are also disclosed herein.

20 Claims, 6 Drawing Sheets

NETWORK VIRTUALIZATION USING IP MAP AND ENCAPSULATION

STATEMENT OF RELATED APPLICATION

The present application claims priority from U.S. Provisional Application No. 61/859,464, entitled NETWORK VIRTUALIZATION USING IP MAP AND ENCAPSULATION, filed on Jul. 29, 2013 and U.S. Provisional Application No. 61/817,582, entitled NETWORK VIRTUALIZATION, filed on Apr. 30, 2013. The contents of these provisional applications are incorporated herein by reference in their entirety.

TECHNICAL FIELD

The present disclosure relates generally to communication networks, and more particularly, to network virtualization.

BACKGROUND

Large Service Providers (SPs) rely on large MPLS (Multiprotocol Label Switching) infrastructures to provide VPN (Virtual Private Network) services to customers that span across the globe.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
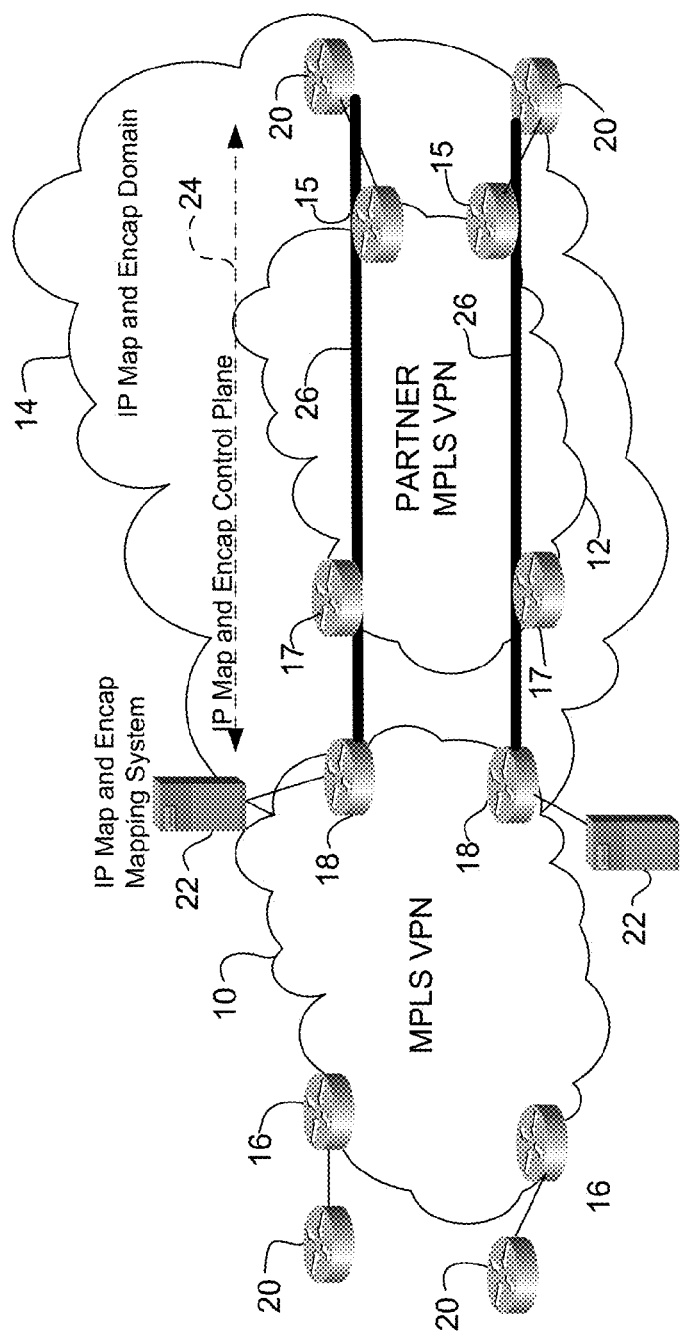
FIG. 1 illustrates an example of a network in which embodiments described herein may be implemented.

In one embodiment, a method generally comprises receiving a packet at a first provider edge device in communication with a mapping system comprising mappings of customer routes to provider edge devices, and mappings of customer virtual routing and forwarding (VRF) instances to a service provider VRF instance, mapping a customer route to one of the provider edge devices and mapping a customer VRF instance to the service provider VRF instance, encapsulating the packet at the first provider edge device based on the mappings, and transmitting the packet.

In another embodiment, an apparatus generally comprises a processor for processing a packet at a first provider edge device in communication with a mapping system comprising mappings of customer routes to provider edge devices, and mappings of customer virtual routing and forwarding (VRF) instances to a service provider VRF instance, mapping a customer route in the packet to one of the provider edge devices and mapping a customer VRF instance to the service provider VRF instance, encapsulating the packet based on the mappings, and transmitting the packet. The apparatus further comprises memory for storing local customer routes.

In yet another embodiment, an apparatus generally comprises a processor for communication with a mapping system comprising mappings of customer routes to provider edge devices in a core network, mapping a customer route to one of the provider edge devices, transmitting the packet to the provider edge device, and propagating local customer routes to the mapping system and provider edge routes to the other provider edge devices. The apparatus further comprises memory for storing the local customer routes for customer networks directly connected to the apparatus and provider edge routes for the provider edge devices in the core network.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

MPLS (Multiprotocol Label Switching) infrastructures are used to provide VPN (Virtual Private Network) services to customers that span across the globe. While the span of conventional SP (Service Provider) MPLS networks may be large, they are not truly global. When customer demand grows within a region where an SP does not have a Point of Presence (PoP) and where it does not make economic sense for the SP to invest directly in new network infrastructure within the region, the SP is typically forced into partnering relationships with other local or regional SPs that do have a PoP in that region. From a technical perspective, this results in a need for the primary SP (i.e., the one owning the customer relationship) and the partner SP (i.e., the one with the local or regional PoP) to interconnect their MPLS networks.

When services (e.g. QoS (Quality of Service), IPv4/IPv6 (Internet Protocol version 4/Internet Protocol version 6) address family, multicast, etc.) supporting networks of a primary SP and partner SP are not consistent, the potential services that can be offered to the MPLS VPN customer (end user) are limited to the lowest common denominator of the features supported between either network. This introduces limitations, for example, in terms of address family (IPv6/IPv4), multicast, QoS, and SLA (Service Level Agreement) that cannot be consistently delivered end-to-end, topology controls (the partner network is seen as a 'black box' from the perspective of the primary SP (the one owning the customer account)), and operation complexity due to the need to involve the partner network in every provisioning request, which may also create security issues. In general, establishing global, end-to-end interconnectivity becomes very complicated due to both technical and business agreements between the primary SP and its numerous partner SPs that support its global VPN offering.

In conventional deployments, MPLS VPNs may provide end-to-end communication of customer traffic by carrying full routes for all customer sites within the MPLS VPN routing infrastructure created to support that customer. In order to accomplish this, the SP MPLS VPN network should support full routing contexts for two, distinctly different types of routes; customer routes, and SP MPLS VPN routes. Customer edge (CE) devices responsible for the customer routes at their site may run a routing protocol, such as eBGP (external Border Gateway Protocol), between themselves and their corresponding provider edge (PE) device. These PE devices may install these locally received routes in their local customer VRF (Virtual Routing and Forwarding) routing table. Each PE device throughout the SP MPLS VPN network with connections for the same customer may follow the same process. The PE devices may then send these customer routes to all other PE devices, and receive from all other PE devices their locally learned routes. In this example, every customer VRF on each PE device in the SP MPLS VPN learns all customer routes.

For SP MPLS VPN routes, each CE device is connected to at least one PE device. These connections between CE and PE devices, known as the PE-CE infrastructure routes, have addressing that may also need to be learned locally and propagated to all other customer VRFs maintained on PE devices. In this example, every customer VRF on each PE device in the SP MPLS VPN learns all PE-CE infrastructure routes. Typically, the full customer VRF routing table, including both customer routes and PE-CE infrastructure routes, that is created and maintained on each PE device is pushed back out to the CE device, creating the end-to-end communication capability.

Several problems can arise with this conventional deployment of MPLS VPNs. For example, customer routes can be evanescent; that is, they come and go at various times, which results in a need for the PE devices to learn and propagate these routes throughout the SP MPLS VPN network to each customer VRF on each PE device, and down to each CE device. This 'route thrashing' can cause CPU (Central Processing Unit) challenges on PE devices. Also, when customer demand grows, the number of VRFs on each PE, and the number of routes stored in each VRF increases. This can also further exacerbate route thrashing.

Due to the above issues, SPs may need to set limitations on the number of customers and customer routes that can be added to any PE device so that operations are kept in a 'safe' range. These restrictions limit network scalability and directly impact revenue potential.

The embodiments described herein provide an IP Map and Encap (encapsulation) system running as an overlay that can be integrated within an SP MPLS VPN network. In one embodiment, mechanisms such as Group Domain of Interpretation (GDOI) encryption may be integrated with IP Map and Encap VPNs to add services on a per customer VRF basis or on a customer SP MPLS VPN VRF basis. In another embodiment, an SP management instance may be created within the IP Map and Encap MPLS VPN for customer device management. In yet another embodiment, an IP Map and Encap system may be integrated on PE devices within an SP MPLS core network to provide route reduction.

As described in detail below, a system, referred to herein as an 'IP Map and Encap' or 'Map and Encap' system, operates in certain embodiments to map and encapsulate traffic received at a primary SP VPN and provide an overlay for the traffic that traverses over (i.e., 'over the top') of a partner SP VPN thereby providing virtual end-to-end global connectivity without physically extending the primary SP infrastructure. In one example, the IP Map and Encap system may operate in accordance with LISP (Locator/Identifier Separation Protocol). The IP Map and Encap system may operate, for example, in accordance with one or more embodiments described in U.S. Provisional Patent Application No. 61/817,582, filed Apr. 30, 2013 and U.S. patent application Ser. No. 14/155,190, filed Jan. 14, 2014, which are incorporated herein by reference in their entirety.

Referring now to the drawings, and first to FIG. 1, an example of a network in which embodiments described herein may be implemented is shown. For simplification, only a small number of nodes are shown. In the example shown in FIG. 1, a first (primary) network 10 is in communication with a second (partner) network 12. In one embodiment, network 10 is associated with a primary SP (Service Provider) and network 12 is associated with a different SP (e.g., local or regional SP). In the example shown in FIG. 1, networks 10 and 12 are MPLS (Multiprotocol Label Switching) VPNs (Virtual Private Networks). The partner MPLS VPN 12 may be, for example, a layer 3 (L3) network. In one example, an MPLS 'Option A' interconnect (as described in IETF RFC 4364, "BGP/MPLS IP Virtual Private Networks (VPNs)", E. Rosen et al., February 2006) is used between the two VPNs 10, 12.

The networks 10, 12 are in communication over an IP Map and Encap domain 14. The primary VPN 10 may be in communication with any number of partner VPNs 12 through the IP Map and Encap domain 14.

In one embodiment, the system includes a data plane comprising network devices moving bits between MPLS and the Map and Encap system (indicated by line 26 in FIG. 1), and a control plane (indicated by line 24 in FIG. 1) comprising the devices building and maintaining a relationship between a protocol (e.g., BGP (Border Gateway Protocol)) running the MPLS VPN and a Map and Encap mapping system 22.

Each network 10, 12 may include any number of edge devices or intermediate (core) nodes (e.g., routers, switches, access layer devices, aggregation layer devices, or other network devices), which facilitate passage of data within the network. In the example shown in FIG. 1, each VPN 10, 12 includes a plurality of edge devices. Provider edge (PE) devices 16 located in the first network 10 are in communication with customer edge (CE) devices 20. PE devices 18 in the first network 10 are in communication with PE devices 17 in the second network 12. PE devices 15 located in the second network 12 are in communication with CE devices 20. The edge devices may be routers, switches, or other network devices configured to perform forwarding functions (e.g., L2, L3, or L2/L3 devices).

In the example shown in FIG. 1, edge devices 18 in network 10 are in communication with IP Map and Encap mapping system 22. The mapping system 22 may be implemented on a gateway, server (e.g., mapping system server) or any other type of network device. A mapping server may, for example, provide the control plane with mapping that allows the IP Map and Encap system to encapsulate customer traffic between locations. The mapping server may maintain, for example, customer prefixes known within the IP Map and Encap control plane. The mapping system 22 may comprise any number of physical or virtual devices located in one or more networks. Also, the mapping system 22 may include one or more databases stored on one or more network devices.

In certain embodiments, the mapping system 22 maintains customer prefix segmentation within the IP Map and Encap control plane, for example. A single SP VRF may be deployed per VPN customer within the MPLS VPN network and serve as a locator space segmentation for the encapsulation side of the IP Map and Encap data plane. Examples of customer segmentation are provided below with respect to FIGS. 4, 5, and 6.

In one example, the edge devices 17, 18 are configured to perform ASBR (Autonomous System Boundary Router) functions. The edge devices 18 located in the MPLS VPN 10 may also be configured to perform proxy xTR (ingress tunnel router (ITR)/egress tunnel router (ETR)) functions. The CE devices 20 in the IP Map and Encap domain 14 may also be configured to perform xTR functions.

As shown in the example of FIG. 1, ASBR devices 18 and CE devices 20 are located at the ends of Map and Encap tunnels 26, which allow the Map and Encap system to traverse over the partner network 12. This reduces the partner network 12 to a transport platform so that the partner network only needs to forward packets based on an outer (encap) IP header. In one or more embodiments, services provided by the primary SP VPN 10 are tunneled across (i.e., over the top of) the partner network 12, thereby eliminating the need to interface each service at the edge interconnecting the two networks. As shown in FIG. 1, the tunnel 26 allows the primary SP VPN 10 to essentially extend to the CE 20, thus providing virtual end-to-end global connectivity without the need to physically extend the MPLS infrastructure of the primary SP.

Figure 2:
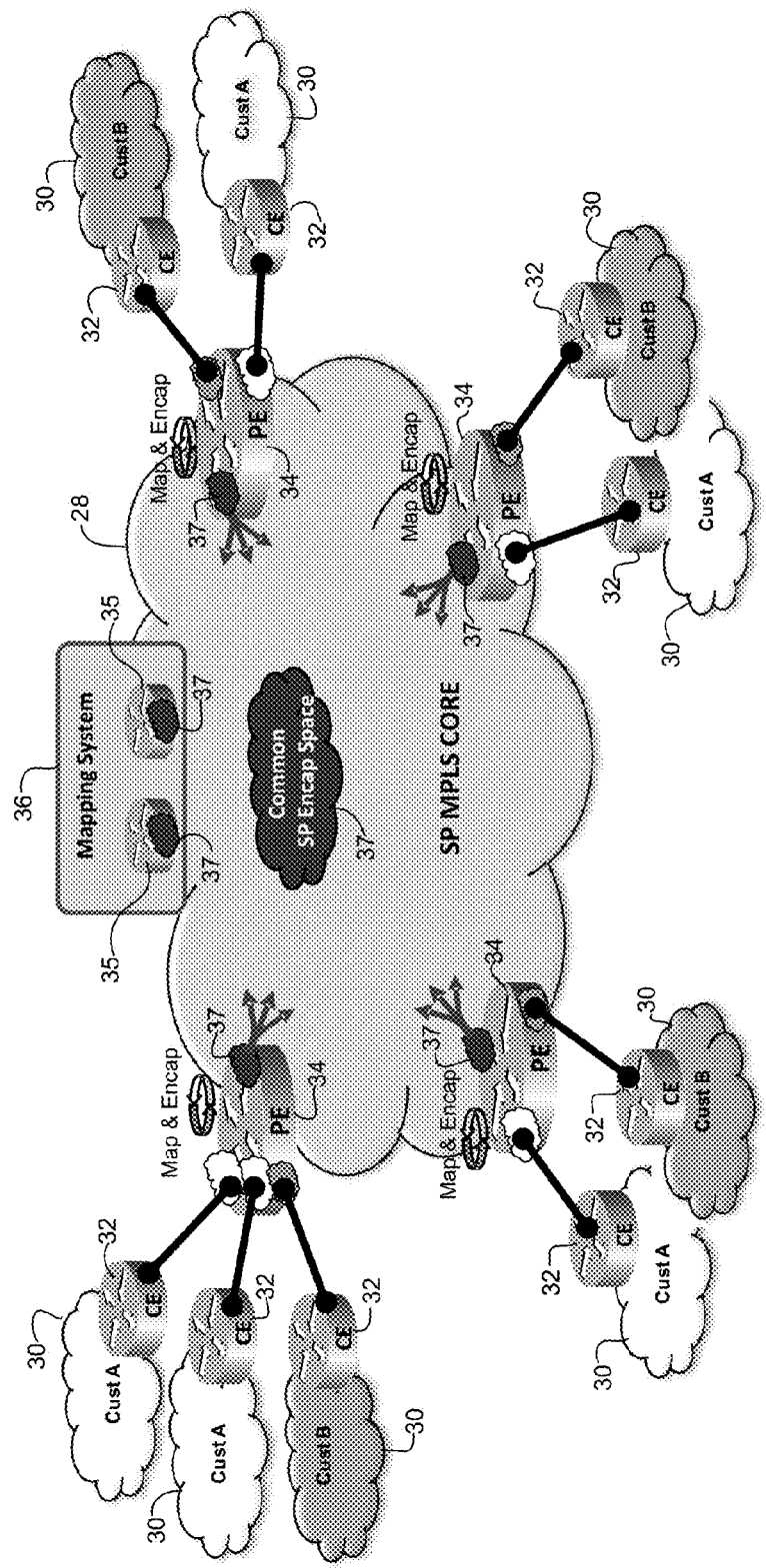
FIG. 2 illustrates another example of a network in which embodiments described herein may be implemented.

FIG. 2 illustrates an example of the IP Map and Encap system overlay, within an SP MPLS VPN network 28. The IP Map and Encap system is directly integrated on PE devices 34 within SP MPLS core network 28. The IP Map and Encap system overlay traverses over the top of the SP MPLS VPN network 28, thereby reducing the SP MPLS VPN network to a transport network that only needs to forward packets based on the outer (encap) IP header. As described in detail below, integration of the IP Map and Encap VPNs on PE devices 34 within the SP MPLS network 28 reduces overall routing table size on the PE devices and reduces or eliminates customer route thrashing.

In the example shown in FIG. 2, the SP MPLS core network 28 is in communication with a plurality of customer networks 30 (customer A, customer B). Each customer network 30 includes a customer edge (CE) device 32 in communication with a provider edge (PE) device 34. The PE devices 34 may be in communication with any number of customer networks or hosts. The PE devices 34 communicate over the Map and Encap system in a common SP encap (encapsulation) space 37. The PE devices 34 are in communication with mapping system 36. As previously described, the mapping system 36 may maintain customer prefixes or customer prefix segmentation within the IP Map and Encap control plane, for example. The mapping system 36 may comprise any number of physical or virtual devices 35 located in one or more networks and may include one or more databases stored on one or more network devices.

Further details of the networks shown in FIGS. 1 and 2 are provided below with respect to embodiments that may be implemented on one or both networks.

It is to be understood that the networks shown in FIGS. 1 and 2 are only examples and the embodiments described herein may be implemented in networks comprising different network topologies or network devices, or utilizing different protocols, without departing from the scope of the embodiments. For example, MPLS VPNs are shown in FIGS. 1 and 2 and used in the examples described below, however, the embodiments may be implemented in other types of VPNs. Thus, it is to be understood that MPLS is provided only as an example in the embodiments described herein.

Figure 3:
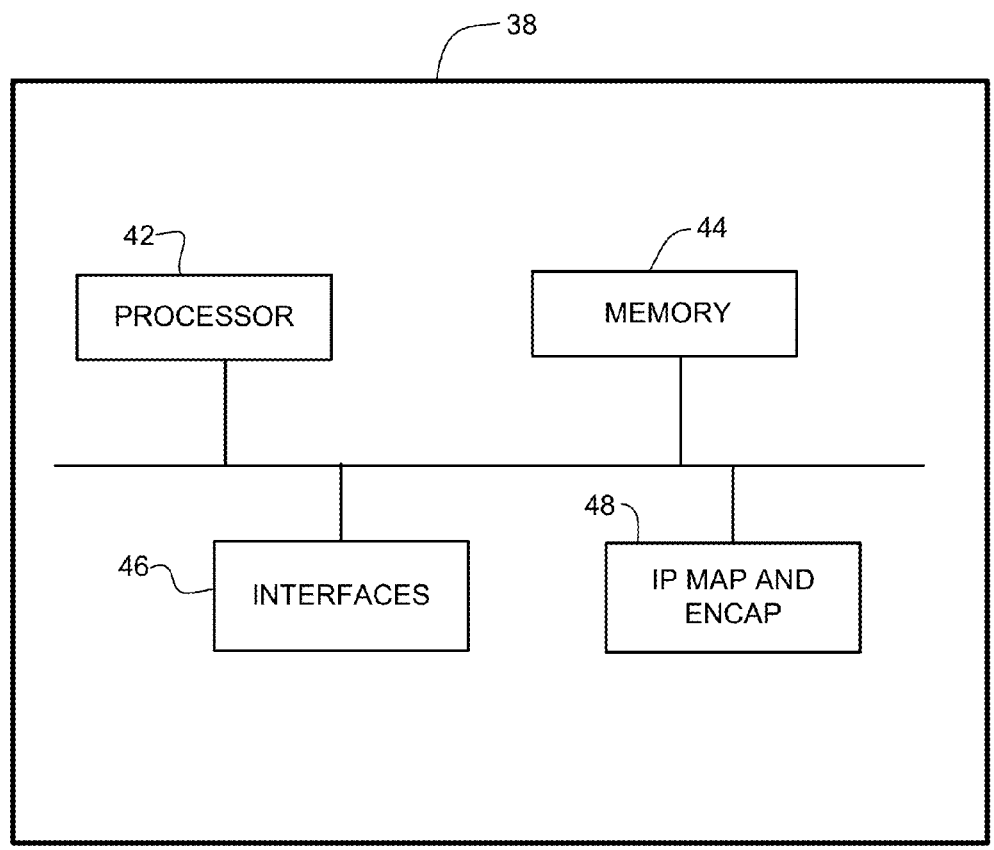
FIG. 3 depicts an example of a network device useful in implementing embodiments described herein.

FIG. 3 illustrates an example of a network device 38 that may be used to implement the embodiments described herein. In one embodiment, the network device 38 is a programmable machine that may be implemented using any suitable combination of hardware, firmware, and software. The network device 38 includes one or more processor 42, memory 44, network interfaces 46, and IP Map and Encap components 48.

Memory 44 may be a volatile memory or non-volatile storage, which stores various applications, operating systems, modules, and data for execution and use by the processor 42. For example, IP Map and Encap components 48 (e.g., module, code, logic, database, etc.) may be stored in the memory 44. One or more IP Map and Encap components may be located at another network device (e.g., IP Map and Encap mapping system 22 in FIG. 1). The device 38 may include any number of memory components.

Logic may be encoded in one or more tangible media for execution by the processor 42. For example, the processor 42 may execute codes stored in a computer-readable medium such as memory 44. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 38 may include any number of processors 42.

The network interfaces 46 may comprise any number of interfaces (linecards, ports) for receiving data or transmitting data to other devices. The network interface may include, for example, an Ethernet interface for connection to a computer or network.

It is to be understood that the network device 38 shown in FIG. 3 and described above is only an example and that different configurations of network devices may be used. For example, the network device 38 may further include any suitable combination of hardware, software, algorithms, processors, devices, components, or elements operable to facilitate the capabilities described herein.

Figure 4:
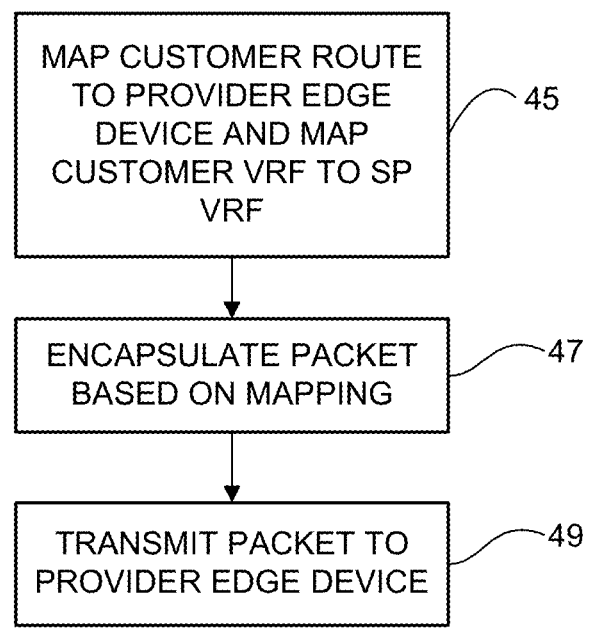
FIG. 4 is a flowchart illustrating a process for control plane segmentation with IP Map and Encapsulation, in accordance with one embodiment.

FIG. 4 is a flowchart illustrating an overview of a process for maintaining customer segmentation within the IP Map and Encap system, in accordance with one embodiment. As described above, provider edge devices 18, 34 are in communication with mapping system 22, 36 (FIGS. 1 and 2, respectively). The mapping system includes mappings of customer routes to provider edge devices and mappings of customer virtual routing and forwarding (VRF) instances to a service provider VRF instance. A first provider edge device receives a packet and maps a customer route in the packet to one of the provider edge devices in the network and also maps a customer VRF instance to the service provider VRF instance (step 45). The customer route may be, for example, a destination address or a customer prefix. The PE device may contact the mapping server to obtain mapping information or search its own routing tables. The PE device encapsulates the packet based on the mappings and transmits the packet on the overlay to a destination provider edge device (steps 47 and 49). As described further below, the customer VRF instances may be mapped to a single VRF per VPN customer within the MPLS VPN network so that customers can run multiple VRFs, while the SP only needs to run a single VRF instance within the core MPLS VPN network. The VRF instances may be used to apply per customer departmental policy (e.g., GDOI) and customer SP VPN policy. The customer VRF instances may also be mapped to a management instance for use in customer device management. The management instance may be common to all customers or common to a single customer, for example.

The following describes examples of embodiments that may be implemented in the networks shown in FIG. 1 and/or FIG. 2. As noted above, the embodiments described below may also be implemented in networks having different network topologies, configurations, or network devices.

Integration of Policies with Map and Encapsulation VPNs

The embodiments described below may be implemented in the network shown in FIG. 1 or FIG. 2, for example.

Certain embodiments provide methods and apparatus for integrating policies (mechanisms) with IP Map and Encap VPNs. In one embodiment Group Domain of Interpretation (GDOI) encryption mechanisms are integrated with the Map and Encap system. GDOI is a cryptographic protocol for group key management, specified in IETF RFC 6407 ("The Group Domain of Interpretation", B. Weis et al., October 2011), which establishes group security association parameters amongst all sites in a VPN (as compared with the point-to-point security associations normally established within IPsec mechanisms). By integrating GDOI mechanisms directly within the IP Map and Encap system, confidentiality and integrity security services may be applied in a scalable manner to the customer overlay VPN services already enabled by the IP Map and Encap services. Thus, certain embodiments may provide customers with the option of adding this protection suite to those provided by the MPLS VPN network.

Figure 5:
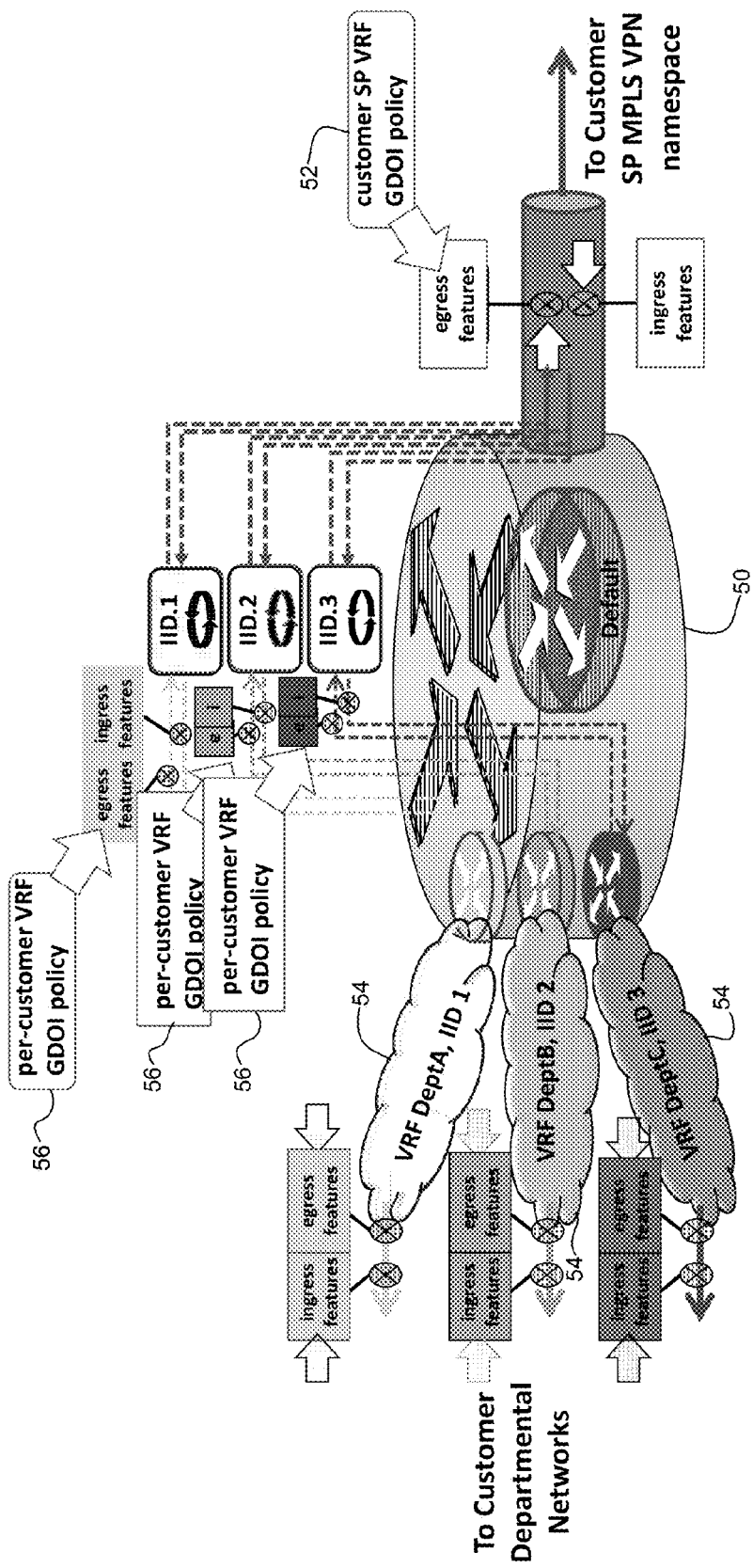
FIG. 5 illustrates application of per customer departmental VPN (Virtual Private Network) GDOI (Group Domain of Interpretation) policy and customer SP (Service Provider) VPN GDOI policy, in accordance with one embodiment.

FIG. 5 illustrates an example of per customer departmental VPN GDOI policy and customer SP VPN GDOI policy, in accordance with one embodiment. In this example, an SP runs an MPLS VPN network and an IP Map and Encap system as an overlay to this MPLS VPN network (as shown in FIG. 1, for example). The SP may, for example, deploy mapping server 22 that maintains customer prefix segmentation within the IP Map and Encap control plane 24 (FIGS. 1 and 5). The SP may also deploy a single VRF per VPN customer within the MPLS VPN network serving as locator space segmentation for the Encap side of the IP Map and Encap data plane. FIG. 5 illustrates a single customer SP VRF.

Certain embodiments allow the customer to run multiple VRF instances 54 for internal, departmental segmentation, while the SP runs the single customer VRF instance 52 within the core MPLS VPN network. VRF allows multiple instances of a routing table to co-exist within the same router 50 at the same time.

The map server may provide control plane segmentation, which permits overlapping IP addresses within customer VPNs. The IP Map and Encap data plane devices may utilize this control plane information within packet headers built during the encapsulation process to segment traffic across the single SP VRF 52 within the SP MPLS VPN network.

In one example, a subset (e.g., 1, 2, 3 . . . ) or all of the customers desire (or are required) to run IPsec mechanisms to provide confidentiality (encryption) and integrity of their traffic. Since the IP Map and Encap overlay segments address space into multiple customer VRFs (departmental VPNs) 54 (the mapped space) and the SP MPLS VPN VRF (the encap space), integrating GDOI enables the ability to apply individually tailored security policies 56 to each customer VRF 54, or a different, single policy 52 to the SP VPN VRF, or both. These security policies 52, 56 may also be defined separately on a per-address family (e.g., IPv4, IPv6) basis for further granularity. The policies may be applied at an egress feature as shown in FIG. 5.

The overlay shown in FIG. 1 or 2 may extend across any locator space in which a GDOI key server is deployed. The key server is associated with the SP VRF so that it can be used to support encryption in the virtualized environment without needing to understand the virtualization.

The integration of GDOI encryption mechanisms with IP Map and Encap VPNs add highly scalable confidentiality and integrity security services on a per customer VRF basis (micro-application of encryption and integrity policies for individual departmental VRFs within a single customer), or on a customer SP MPLS VPN VRF basis (single, fat pipe encryption and integrity policy), or both.

In certain embodiments, enabling an SP to run an IP Map and Encap system as an overlay to an MPLS VPN network to allow customers to run multiple VRFs for internal, departmental segmentation reduces the number of customer VRFs required within the core MPLS VPN network to a single MPLS VRF per customer. This may significantly improve scaling limitations within the core MPLS VPN network, allowing the SP to more efficiently operate the network.

SP Management Instance for Customer Device Management in Map and Encapsulation System The embodiments described below may be implemented in the network shown in FIG. 1 or FIG. 2, for example.

Certain embodiments provide methods and apparatus to enable an SP to create and use a separate management instance within their IP Map and Encap MPLS VPN overlay to create an isolated customer device (e.g., router) management overlay. By creating and deploying a separate management instance, an SP running an IP Map and Encap system as an overlay to an MPLS VPN network may be able to add flexibility and simplify its network operations environment.

Figure 6:
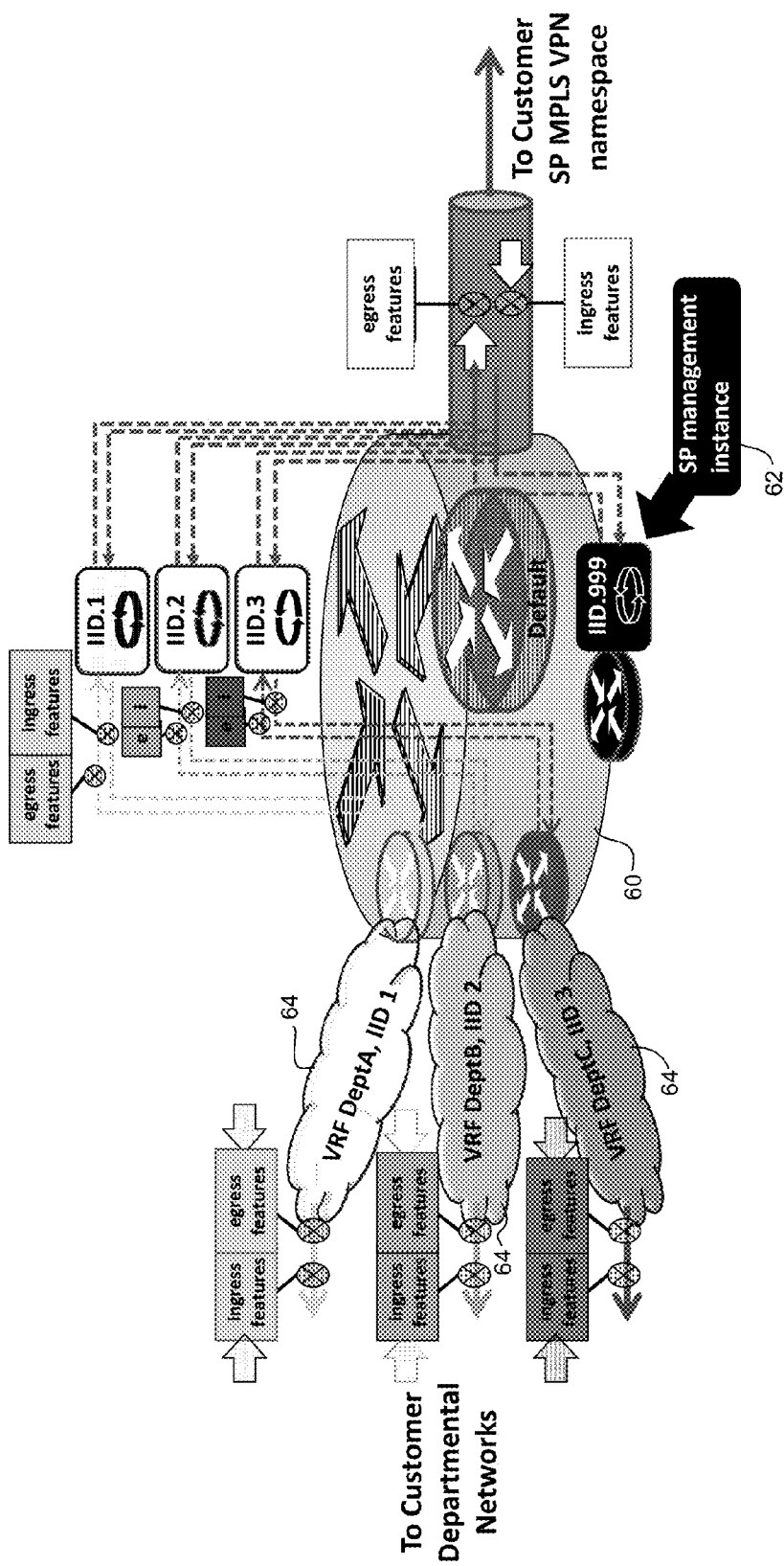
FIG. 6 illustrates an SP management instance for isolated customer device management in an IP Map and Encapsulation MPLS (Multiprotocol Label Switching) VPN overlay, in accordance with one embodiment.

FIG. 6 illustrates an example of an SP management instance 62 for isolated customer device management in an IP Map and Encap MPLS VPN overlay. In this example, an SP runs an MPLS VPN network and an IP Map and Encap system as an overlay to this MPLS VPN network (as shown in FIG. 1, for example). The SP may, for example, deploy mapping server 22 that maintains customer prefix segmentation within the IP Map and Encap control plane 24 (FIGS. 1 and 6). The SP may also deploy a single VRF per VPN customer within the MPLS VPN network serving as locator space segmentation for the Encap side of the IP Map and Encap data plane.

Certain embodiments allow the customer to run multiple VRFs 64 for internal, departmental segmentation, while the SP runs the single customer VRF (management instance) 62 within the core MPLS VPN network. The mapping server may provide control plane segmentation, which permits overlapping IP addresses within customer VPNs. The IP Map and Encap data plane devices may utilize this control plane information within packet headers built during the encapsulation process to segment traffic across the single SP VRF (customer SP VRF) 62 within the SP MPLS VPN network.

In one example, the SP creates its own VRF instance as management instance 62 on customer devices 60 for the purposes of enabling a consistent and uniform access methodology. The management instance 62 may be, for example, common to all customers and used across all devices, regardless of customer, to provide a consistent access environment across all devices. The management instance 62 may also be common to a single customer and used across all of the devices only for one customer to provide each customer with a unique common management instance used across all of its devices. The management instance 62 may be optionally protected by IPsec policies to enable confidentiality and integrity, as desired or required.

By deploying management instance 62, the SP can isolate their management traffic from customer traffic, permitting the application of separate service policies and security measures in a consistent manner without worrying about conflicting with customer addressing, or customer traffic policies. The SP may also attain flexibility while at the same time simplifying operational processes in certain embodiments. Management applications may be deployed in a consistently addressed network environment without concern for overlaps with customer addresses.

Enabling an SP to run an IP Map and Encap system as an overlay to an MPLS VPN network to allow customers to run multiple VRFs for internal, departmental segmentation, may reduce the number of customer VRFs needed within the core MPLS VPN network to a single MPLS VRF per customer. This significantly improves scaling limitations within the core MPLS VPN network, allowing the SP to more efficiently operate the network. By also creating and using a separate management instance within their IP Map and Encap MPLS VPN overlay, the SP can isolate customer router management traffic within its own overlay, which simplifies and at the same time provides the SP added flexibility in its network operations environment.

Integration of Map and Encapsulation System on PE Devices within SP Core Network The embodiments described below may be implemented in the network shown in FIG. 2, for example.

Certain embodiments provide methods and apparatus for directly integrating an IP Map and Encap system on PE devices 34 within SP MPLS core network 28 (FIG. 2). By directly integrating the IP Map and Encap system on PE devices 34, restrictions that may be imposed to mitigate deficiencies in MPLS architectures can be overcome in a highly scalable and efficient manner. This gives the SP an opportunity to fully optimize traffic handling capacity and the revenue-generating capabilities of the PE devices 34 deployed in the SP MPLS VPN network 28.

As previously described, there are two major aspects to the IP Map and Encap system; data plane and control plane. The date plane includes devices moving bits between MPLS and the IP Map and Encap system. The control plane includes devices building and maintaining a relationship between BGP (running the MPLS VPN) and the IP Map and Encap Mapping System. The IP Map and Encap system overlay traverses over the top of the SP MPLS VPN network 28, reducing the SP MPLS VPN network to a pure transport network, which only needs to forward packets based on an outer (encap) IP header. The following describes control plane and data plane aspects for integrating the IP Map and Encap system directly on the MPLS VPN PE devices 34.

Control plane aspects include, for example, that customer routes are advertised by each CE 32 (e.g., via eBGP) to the PE device 34 and the PE stores these routes locally in the customer VRF. Instead of pushing these customer routes to all other MPLS VPN PE devices 34, the PE device registers these customer routes to the IP Map and Encap mapping system 36. The other PE devices 34 follow the same procedures. By not propagating customer routes to all PE devices 34, the size of the routing table on each PE device is significantly reduced. This may allow, for example, the SP to add more customers and utilize deployed assets (and increase revenue) to a much larger extent. In addition, route trashing is greatly reduced since the PE devices 34 are no longer forwarding customer routes throughout the MPLS VPN network 28. PE infrastructure routes are propagated to PE devices 34. These PE routes are used for encapsulation in the IP Map and Encap system to provide end-to-end reachability of the network devices themselves. These routes are typically very stable and small in number and, therefore, do not cause thrashing or scaling issues.

Data plane aspects include, for example, that when a PE device 34 receives customer traffic, the PE device observes its local VRF routing table for that customer, and any customer destinations that are also directly connected to the same PE device 34 cause the traffic to be forwarded natively. Any customer destinations that are not directly connected to the same PE device 34 cause the PE device to observe the IP Map and Encap mapping system 36, which informs the PE device how to map the customer traffic into the appropriate encapsulation to a remote PE device where the customer site 30 is connected locally. The receiving PE device 34 decapsulates these packets, and then forwards the traffic locally to the directly connected CE device 32.

In certain embodiments, there are two potential address spaces into which customer packets may be encapsulated. One option is to use the existing customer VRF. For an existing customer VRF, the VRF exists and already contains customer PE infrastructure routes. In this case, each customer VRF has its own PE infrastructure addresses. Another option is to create and use a common encapsulation address space VRF (FIG. 2). A new VRF may be created for encapsulating all customer traffic (even different ones in their own customer VRFs). This approach allows the SP to establish a very secure and stable encapsulation network between all PE devices 34.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving a packet at a first provider edge device in communication with a mapping system comprising mappings of customer routes to provider edge devices, and mappings of customer virtual routing and forwarding (VRF) instances to a service provider VRF instance;
    mapping a customer route to one of the provider edge devices and mapping a customer VRF instance to the service provider VRF instance;
    encapsulating the packet at said first provider edge device based on said mappings; and
    transmitting the packet.

2. The method of claim 1 wherein said mappings of customer VRF instances to the service provider VRF instance comprises a plurality of customer VRF instances associated with a VPN (Virtual Private Network) customer mapped to a single service provider VRF instance for the VPN customer.

3. The method of claim 1 wherein the mapping system maintains customer prefix segmentation.

4. The method of claim 1 further comprising applying a Group Domain of Interpretation (GDOI) policy to each of said customer VRF instances.

5. The method of claim 1 further comprising applying a Group Domain of Interpretation (GDOI) policy to the service provider VRF instance associated with a VPN (Virtual Private Network) customer.

6. The method of claim 1 wherein the service provider VRF instance comprises a management instance for customer device management.

7. The method of claim 6 wherein the management instance is common to all customers in communication with the provider edge devices.

8. The method of claim 6 wherein the management instance is unique to a VPN (Virtual Private Network) customer.

9. An apparatus comprising:
- a processor for processing a packet at a first provider edge device in communication with a mapping system comprising mappings of customer routes to provider edge devices, and mappings of customer virtual routing and forwarding (VRF) instances to a service provider VRF instance, mapping a customer route in the packet to one of the provider edge devices and mapping a customer VRF instance to the service provider VRF instance, encapsulating the packet based on said mappings, and transmitting the packet; and
- memory for storing local customer routes.

10. The apparatus of claim 9 wherein said mappings of customer VRF instances to the service provider VRF instance comprises a plurality of customer VRF instances associated with a VPN (Virtual Private Network) customer mapped to a single service provider VRF instance for the VPN customer.

11. The apparatus of claim 9 wherein the mapping system maintains customer prefix segmentation.

12. The apparatus of claim 9 wherein the processor is further operable to apply a Group Domain of Interpretation (GDOI) policy to each of said customer VRF instances.

13. The apparatus of claim 9 wherein the processor is further operable to apply a Group Domain of Interpretation (GDOI) policy to the service provider VRF instance associated with a VPN (Virtual Private Network) customer.

14. The apparatus of claim 9 wherein the service provider VRF instance comprises a management instance for customer device management.

15. An apparatus comprising:
- a processor for communication with a mapping system comprising mappings of customer routes to provider edge devices in a core network, mapping a customer route to one of the provider edge devices, transmitting the packet to the provider edge device, and propagating local customer routes to the mapping system and provider edge routes to the other provider edge devices; and
- memory for storing the local customer routes for customer networks directly connected to the apparatus and provider edge routes for the provider edge devices in the core network.

16. The apparatus of claim 15 wherein the memory is configured for storing the local customer routes in a customer VRF (Virtual Routing and Forwarding) table for each of the customer networks in communication with the apparatus.

17. The apparatus of claim 15 wherein the mapping system maintains customer virtual routing and forwarding (VRF) instances mapped to a service provider VRF instance.

18. The apparatus of claim 17 wherein one or more of the VRF instances are associated with a Group Domain of Interpretation (GDOI) policy.

19. The apparatus of claim 17 wherein the service provider VRF comprises a management instance for customer device management.

20. The apparatus of claim 15 wherein the apparatus comprises a provider edge device configured for operation in a service provider MPLS (Multiprotocol Label Switching) network.

* * * * *